United States Patent
Chiba et al.

[11] Patent Number: 5,180,608
[45] Date of Patent: Jan. 19, 1993

[54] PROCESS FOR PRODUCING A RIGID MAGNETIC DISK BY LONGITUDINALLY GENERATING STANDING WAVES OR INTERFERENCE WAVES IN AN UNDRIED APPLIED MAGNETIC PAINT

[75] Inventors: Katsuyoshi Chiba, Hachioji; Masayuki Katsumoto, Kodaira; Yasutaro Uesaka, Kokubunji; Hajime Fukke, Tama; Heigo Ishihara, Tokyo; Iwao Matsuyama, Sagamihara; Naoki Kodama, Tachikawa; Hitoshi Inoue; Yoshiharu Terada, both of Kokubunji, all of Japan

[73] Assignee: Hitachi, Ltd., Tokyo, Japan

[21] Appl. No.: 604,380

[22] Filed: Oct. 24, 1990

Related U.S. Application Data

[63] Continuation of Ser. No. 489,500, Mar. 7, 1990, abandoned.

[30] Foreign Application Priority Data

Mar. 9, 1989 [JP] Japan .................................. 1-55007

[51] Int. Cl.$^5$ ............................. G11B 5/00; B05D 5/00
[52] U.S. Cl. .................................... 427/560; 427/128; 427/130; 427/550; 427/548; 428/64; 428/65; 428/694; 428/900
[58] Field of Search ................... 427/128, 57, 130, 48, 427/47; 428/900, 694, 64, 65

[56] References Cited

U.S. PATENT DOCUMENTS

| | | | |
|---|---|---|---|
| 2,544,622 | 1/1948 | Ulmer et al. | 427/57 |
| 3,676,216 | 7/1972 | Abitboul | 427/57 |
| 4,330,728 | 5/1982 | Solie | 310/313 |
| 4,395,447 | 7/1983 | Nakamatsu | 428/66 |
| 4,719,480 | 1/1988 | Elrod et al. | 346/140 R |
| 4,759,775 | 7/1988 | Peterson et al. | 55/15 |

FOREIGN PATENT DOCUMENTS

| | | |
|---|---|---|
| 59-112435 | 6/1984 | Japan . |
| 60-83224 | 5/1985 | Japan . |
| 62-18629 | 1/1987 | Japan . |

OTHER PUBLICATIONS

Patent Abstracts of Japan, vol. 9, No. 227, 13 Sep. 1985, & JP-A-60 083 224, May 11, 1985.
Patent Abstracts of Japan, vol. 11, No. 194, 23 Jun. 1987, & JP-A-62 018 629, Jun. 27, 1987.

*Primary Examiner*—Paul J. Thibodeau
*Assistant Examiner*—Stefan A. Resan
*Attorney, Agent, or Firm*—Kenyon & Kenyon

[57] ABSTRACT

A coating type, magnetic disk is produced by applying a magnetic paint containing magnetic powders in a dispersed state to a non-magnetic substrate, thereby forming a magnetic recording film thereon, and applying surface waves to the magnetic recording film in an undried state. By applying the surface waves to the magnetic recording film, dispersibility and orientation of the magnetic powders are improved and a longitudinally oriented, coating type magnetic disk with distinguished electromagnetic properties, such as a high S/N ratio, etc. can be obtained.

14 Claims, 3 Drawing Sheets

PROCESS FOR PRODUCING A RIGID MAGNETIC DISK BY LONGITUDINALLY GENERATING STANDING WAVES OR INTERFERENCE WAVES IN AN UNDRIED APPLIED MAGNETIC PAINT

This application is a continuation of application Ser. No. 07/489,500, filed Mar. 7, 1990, now abandoned.

BACKGROUND OF THE INVENTION

The present invention relates to a coating type magnetic disk for use in memory apparatus, etc., and a process and an apparatus for producing the magnetic disk.

Heretofore, a coating type magnetic disk has been produced by dispersing magnetic powders in a binder (macromolecular binder) or its solution in a sand mill, kneader or ball mill, thereby preparing a magnetic paint and applying the magnetic paint to a substrate, followed by orientation, if required, and by heat curing and polishing. If further required, a lubricant is applied to the coating film. A thermo-setting resin is usually used as a binder, and thus can be thermally cured, and sometimes a binder may be used only with heating. The magnetic paint is stirred during the preservation to prevent the magnetic powders from reaggregation.

With recent progress of higher density magnetic disks, magnetic powders composed of finer particles have been used. In a magnetic paint containing such magnetic powders, the magnetic powders are liable to reaggregate and it is difficult to completely prevent the reaggregation only by the stirring. To solve this problem, Japanese Patent Application Kokai (Laid-open) No. 62-18629 proposes to uniformly apply a magnetic paint to a substrate to a predetermined thickness, applying an ultrasonic vibration thereto, and immediately thereafter applying a uniform magnetic field thereto, thereby orienting magnetic powders. Even if reaggregation takes place, the structure of reaggregation is broken by the proposed process and the rotational motion of magnetic powders by orientation under a magnetic field is facilitated to attain a high orientation and improve the hysteresis loop squareness. Japanese Patent Application Kokai (Laid-open) No. 60-83224 proposes to produce a perpendicularly oriented magnetic disk by applying a perpendicular magnetic field and ultrasonic vibration to the substrate.

However, in the above-mentioned Japanese Patent Application Kokai (Laid-open) No. 62-18629 no consideration is given to the production of a magnetic disk of higher density having distinguished electromagnetic properties as a longitudinally oriented magnetic recording medium, for example, good S/N (signal/noise) ratio and hysteresis loop squareness. That is, the above-mentioned process is directed to the production of not a magnetic disk, but a magnetic tape. A magnetic tape has a thick coating film (thickness: more than 1 μm) and a magnetic paint as a material for such a coating film has a high viscosity, for example, 1,000 to 2,000 cp. Thus, in the magnetic paint once highly dispersed by ultrasonic vibration, the magnetic powders do not reaggregate in a short time and thus can be readily oriented by applying a magnetic field thereto right after the dispersion of magnetic powders in a coating film state. On the other hand, a magnetic disk of higher density has a thin coating film (thickness: not more than 0.75 μm). As a material for such a coating film, a magnetic paint having a low viscosity, for example, not more than 500 cp, must be used. In a magnetic paint of low viscosity the magnetic powders more readily aggregate than in a magnetic paint of high viscosity, and thus the degree of aggregation in a coating film state is considerably higher in a magnetic paint of low viscosity than in that of high viscosity. Thus, the structure of aggregates is hard to break even by applying ultrasonic vibration, usually used in the above-mentioned prior art, thereto and the coating film is not brought into a highly dispersed state of magnetic powders. Furthermore, if there is a time difference, even though short, between the application of ultrasonic vibration and the application of magnetic field for orientation, the dispersed magnetic powders will aggregate again, corresponding to the time difference. The magnetic disks thus prepared have problems in electromagnetic properties, for example, deterioration of hysteresis loop squareness, etc.

The perpendicularly oriented magnetic disk disclosed in the above-mentioned Japanese Patent Application Kokai (Laid-open) No. 60-83224 has problems in electromagnetic properties such as a low S/N ratio, easy occurrence of defects, a low output, etc., as compared with the longitudinally oriented magnetic disk, owing to such a peculiar property as perpendicular orientation of magnetic powders.

SUMMARY OF THE INVENTION

The present invention provides a process for producing a longitudinally oriented magnetic disk of high density with distinguished electromagnetic properties, using a magnetic paint containing at least magnetic powders in a dispersed state while preventing the magnetic powders from reaggregation.

The present invention further provides a longitudinally oriented magnetic disk produced according to a new process.

The present invention provides an apparatus for a magnetic disk according to the present process.

The present invention provides (1) a process for producing a magnetic disk, which comprises applying a magnetic paint containing at least magnetic powders in a dispersion state in a macromolecular binder to a non-magnetic substrate and then orienting the magnetic powders by applying surface waves to the applied magnetic paint while keeping the applied magnetic paint in an undried state, thereby forming a magnetic recording film on the non-magnetic substrate, wherein the surface waves are standing waves or interference waves; (2) a process for producing comprises applying a magnetic paint containing at least magnetic powders in a dispersion state in a macromolecular binder to a non-magnetic substrate and then orienting the magnetic powders by applying surface waves to the non-magnetic substrate and the applied magnetic paint while keeping the applied magnetic paint in an undried state, thereby forming a magnetic recording film on the non-magnetic substrate, wherein the surface waves are standing waves or interference waves; (3) a magnetic disk, which comprises a non-magnetic substrate and a magnetic recording film containing at least magnetic powders in a dispersed and oriented state in a macromolecular binder, provided on the non-magnetic substrate, the magnetic powders being distributed in concentric circles with a density gradient in the radial direction and longitudinally oriented; and (4) an apparatus for producing a magnetic disk, which comprises a mount for supporting a non-magnetic substrate having a magnetic recording film containing at least magnetic powders in a dispersed state in a macromolecular binder, the magnetic recording film being in an undried state, and a surface wave vibrator for applying surface waves to the magnetic recording film on the non-magnetic substrate, where a means for applying a magnetic field to the magnetic recording film may be provided, such as a pair of magnets on both sides of the non-magnetic substrate to sandwich the non-magnetic substrate.

Figure 1:
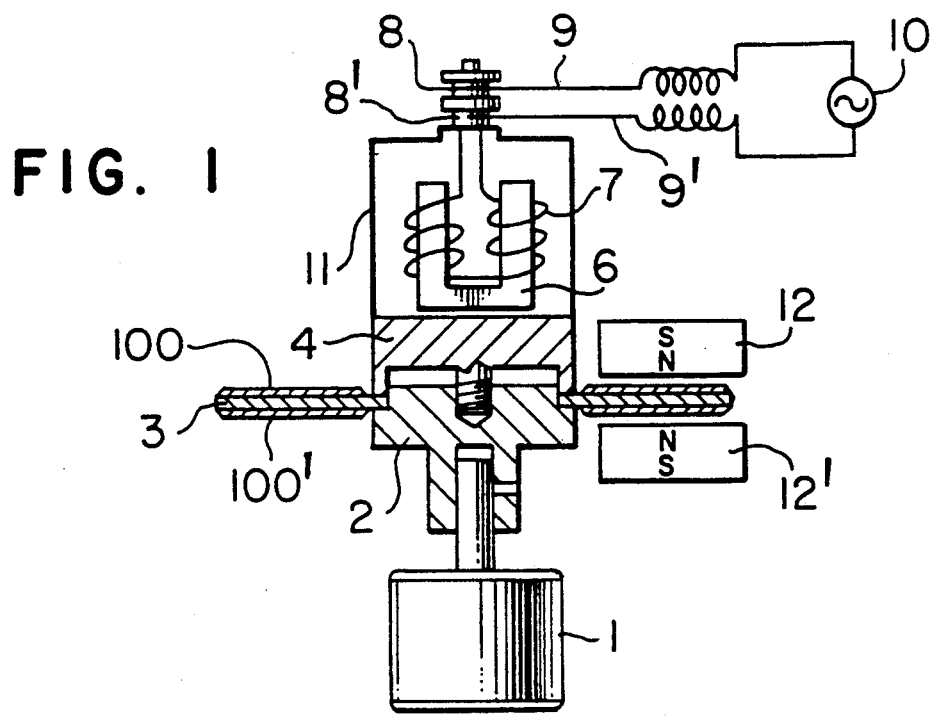
FIG. 1 is a cross-sectional schematic view of an apparatus for producing a magnetic disk according to one embodiment of the present invention.

The present invention is characterized by applying surface waves to the magnetic recording film. The mode of surface waves is classified three types, that is, a concentric circle type mode, a random type mode and an interference type mode. By applying surface waves to, for example, a substrate, the magnetic powders are dispersed, where the dispersion is carried out by an interfacial tension wave, a kind of surface wave. A case of the concentric circle type mode will be later explained, referring to FIG. 3, a case of the random type mode will be explained, referring to FIG. 4 and a case of the interference type mode will be explained referring to FIG. 5B and FIG. 5D.

In the present invention, dispersion and orientation of magnetic powders can be improved by application of a magnetic field for orientation or rotation of a magnetic disk when the surface waves are applied to the magnetic recording film, as compared with the case of applying only surface waves. The magnetic field may be an uneven magnetic field. Application of a magnetic field may be made after the application of surface waves.

Preferably, the magnetic paint for use in the present invention contains a filler such as alumina, etc. besides the magnetic powder. Preferably, the non-magnetic substrate for use in the present invention is composed of a material capable of directly and effectively propagating surface waves, for example, a metal substrate or a ceramic substrate.

In the present invention, a magnetic disk is prepared by forming a coating film to a thickness of about 0.55±0.05 μm or less in the inner peripheral region of a disk, for example, an 5-inch aluminum disk (40.0 mm in inner diameter, 130 mm in outer diameter and 1.9 mm thick) and to a thickness of about 0.65±0.05 μm or less in the outer peripheral region thereof, heat curing the coating film and polishing the cured coating film to a thickness of not more than about 0.35 μm in the inner peripheral region and to a thickness of not more than 0.45 μm in the outer peripheral region. In this manner, a magnetic disk with a recording density of, for example, 30,000 BPI or more can be obtained.

By applying surface waves to the non-magnetic substrate coated with a magnetic paint, the magnetic powders are dispersed and oriented in the coating film. Ultrasonic vibration disclosed in the prior art of the above-mentioned Japanese Patent Application Kokai (Laid-open) No. 62-118629 and Japanese Patent Application Kokai (Laid-open) No. 60-83224 is merely to cause vertical vibration of a substrate (tape or disk) in the thickness direction, whereas the present surface waves are waves propagating in the longitudinal direction of a substrate and thus are effective for disintegrating aggregates of magnetic powders or separating the aggregates in contact from one another and they are effective for the dispersion and orientation of the magnetic powders. In the present invention, the ultrasonic vibration is only a means for generating surface waves. State of dispersion and orientation of the magnetic powders depends on the mode of applied surface waves as already mentioned above, and the mode of surface waves is classified into three types, that is, a concentric circle type mode, a random type mode and an interference type mode.

Differences in the modes will be explained below, referring to FIG. 3, FIG. 4 and FIG. 5B.

Figure 5A:
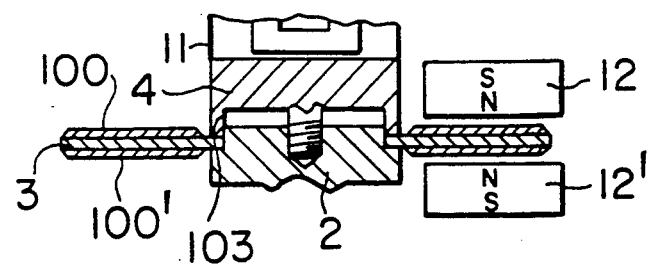
FIG. 5A is a cross-sectional view of surface wave vibrator part having projections in an apparatus for producing a magnetic disk according to another embodiment of the present invention.
Figure 5B:
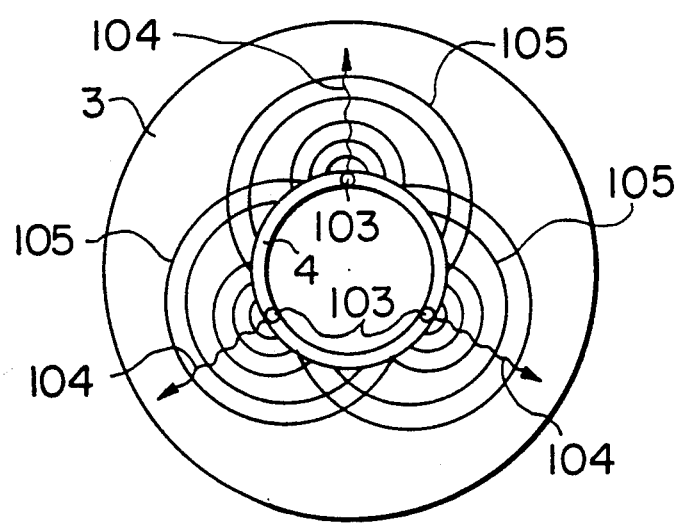
FIG. 5B and FIG. 5C are a view showing the in-plane state of a magnetic disk of interference type mode surface wave when a surface wave vibrator having three projections is used and a cross-sectional, schematic view of surface wave vibrator part, respectively, where numeral 104 shows surface waves, and numeral 105 shows interference type modes.

Explanation will be made, referring to a case where a surface wave vibrator 4 has three projections 103 arranged on the periphery at equal angular positions, as shown in FIG. 5B.

Figure 3:
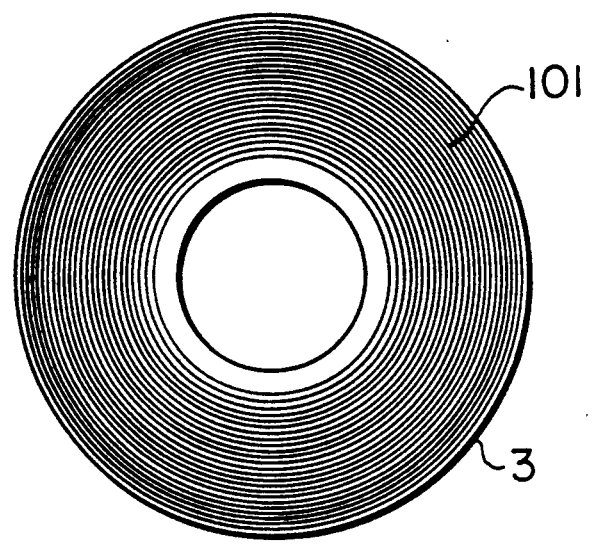
FIG. 3 is a plan view of a magnetic disk of concentric circle type mode, showing the state of dispersion and orientation of magnetic powders when surface waves are applied, where numeral 101 shows a concentric circle type mode.

FIG. 3 is a plan view of a magnetic disk, showing the state of dispersion and orientation of magnetic powders when surface waves of concentric type mode are applied. The concentric circle type mode can be generated when the frequency, phase and amplitude of surface waves applied to the above-mentioned three projections are equal to one another, respectively, and further when the frequency is equal to a resonance frequency proper to a substrate (strictly speaking, a magnetic paint film included). In that case, the resulting surface waves are standing waves. For example, in case of an aluminum disk, 5.25 inches in diameter (40.0 mm in inner diameter and 130 mm in outer diameter) and 2 mm thick as a substrate, vibration may be made with a frequency of about 37 kHz (variable in a range of 1 to 100 W) or its integral multiple. In that case, the resulting surface waves are standing waves. The magnetic powders are distributed in concentric circles with respect to the disk center and with a density gradient in the radial direction. The number of repetitions of the density gradient can be changed by the frequency of the surface waves. The effect is more pronounced by rotation of the disk.

Figure 4:
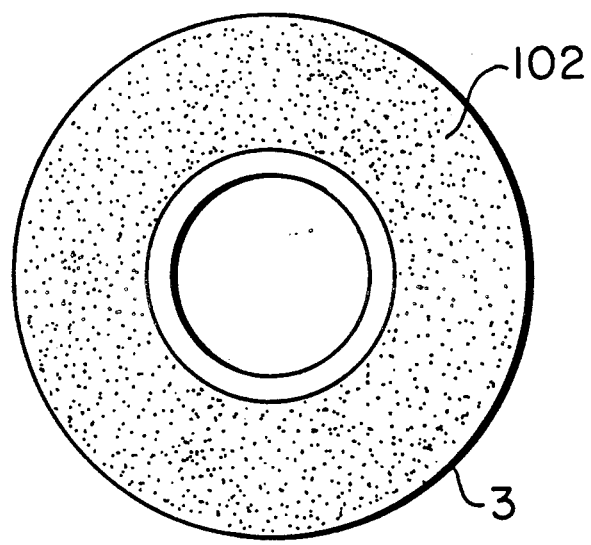
FIG. 4 is a plan view of a magnetic disk of random type mode, showing the state of dispersion and orientation of magnetic powders, when surface waves are applied, where numeral 102 shows a random type mode.

FIG. 4 is a plan view of a magnetic disk, showing the state of dispersion and orientation of magnetic powders when surface waves of random type mode are applied. The random type mode is obtained when the phase of surface waves applied to at least one of the three projections is different from those of the surface waves to other projections. The magnetic powders are distributed with a uniform density, but their orientation is at random.

FIG. 5B shows the state of surface waves in the longitudinal direction of a magnetic disk when surface waves of interference type mode (interference waves) are applied. The interference type mode is obtained when the balance of surface wave propagation from the above-mentioned three projections is disturbed. For example, there is a difference in pressure of the three projections on the substrate. The magnetic powders are unevenly distributed in the thickness direction of the magnetic recording film. The projections are parts of a surface wave vibrator that gives surface waves to a substrate and include not only artificially processed projections, but also parts in the surface wave vibrator, where the parts ultimately serve to give surface waves to the substrates. The conditions for the projections capable of generating surface waves are locations of projections (a distance from the disk center, a distance between the projections, etc.) number of projections, and contact area and pressure of projections. It is desirable to locate the projections at and along the central region of the disk, but the present invention is not limited to the locations at and along the central region of the disk and various locations can be made. For example, projections may be located unevenly in some region to make longitudinal orientation only in a desired region of the disk.

Metals (e.g. aluminum, etc.) or ceramics (e.g. glass, etc.) have a high vibration-propagating speed, and when these materials are used for a disk substrate, the surface waves are more readily generated, irrespective of projection contact positions. At least one projection is satisfactory and particularly in the case of one projection, it is preferable to provide a false projection made from an elastomer (e.g. rubber, teflon, etc.) to stably support the surface wave vibrator on the disk surface. In that case, the surface waves are standing waves of concentric circle type mode. The contact area of projection must be so small as to regard it as a point in contrast to the disk area, or otherwise no surface waves are generated but ultrasonic vibration takes place as in the prior art. The contact pressure of projection must be set to such a value as to allow the surface waves to propagate.

Structure of reaggregates of magnetic powders in a magnetic recording film, even if formed, can be broken by applying a magnetic paint containing magnetic powders dispersed in a macromolecular binder to a non-magnetic substrate, thereby forming a magnetic recording film, and applying surface waves to the substrate while the magnetic recording film is in an undried state. Furthermore, by applying a magnetic field thereto, the magnetic powders can be oriented in a desired direction.

When the magnetic powders are fine powders having an average particle size of, for example, not more than 0.4 $\mu$m, preferably not more than 0.2 $\mu$m, the resistance of the magnetic powders is so small during the movement and rotation in the magnetic recording film that the magnetic powders can be oriented in some direction, desirably in a longitudinal direction without any application of a magnetic field, when the resonance frequency of magnetic powders is substantially in agreement with the frequency of surface waves applied to the substrate.

One embodiment of the present apparatus for producing a magnetic disk is schematically and cross-sectionally shown in FIG. 1 and FIG. 5.

A mount 2 made from a material capable of damping a phase-variable ultrasonic wave, such as Teflon (polytetrafluoroethylene), etc. is provided rotatably by a motor 1, and an aluminum substrate 3 is mounted on the mount 2. A metallic surface wave vibrator 4 is set to the aluminum substrate 3 by a screwing action so as to directly transmit surface waves to the aluminum substrate 3. An ultrasonic wave vibrator 6 is fixed to the surface wave vibrator 4 and these two are mechanically connected. A coil 7 is wound around the ultrasonic wave vibrator 6, and a driving current is supplied to the coil 7 from an ultrasonic wave oscillator 10 through electrode slip rings 8 and 8' and electroconductive sliding pins 9 and 9'. In order to increase the ultrasonic wave vibration efficiency, a vessel 11 is filled with a resin. The mount 2 may be provided above the substrate 3 and the surface wave vibrator 4 may be provided below the substrate 3. A pair of magnets 12 and 12' is provided on both sides of the disk 3 to sandwich the disk 3, as shown in FIG. 1 and FIG. 5A, so as to apply a magnetic field thereto, where a repulsion field can be obtained. The magnets can be provided at various locations, for example, by shifting the vertical levels, etc., as disclosed in Japanese Patent Publication No. 56-45210.

Figure 5C:
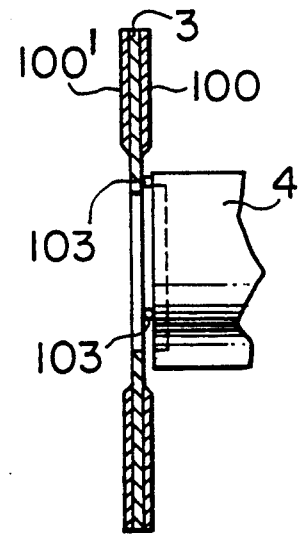
Figure 5D:
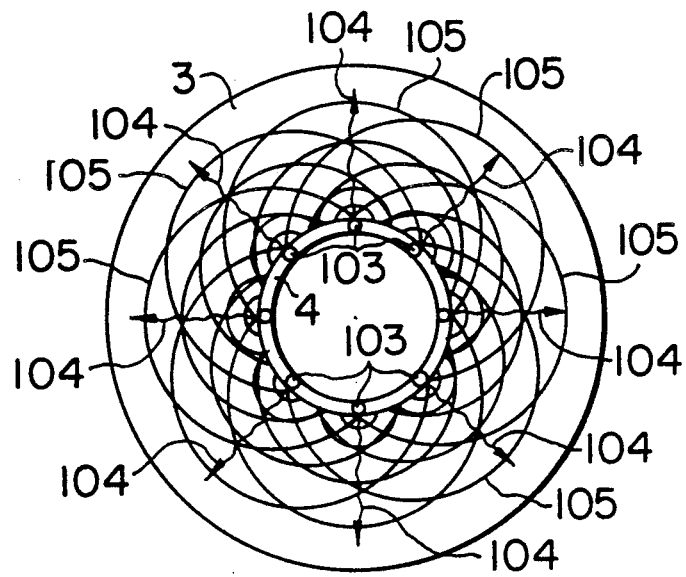
FIG. 5D and 5E are a view showing the in-plane state of a magnetic disk of interference type mode surface wave when a surface wave vibrator having eight projections is used, and a cross-sectional, schematic view of surface wave vibrator part, respectively.
Figure 5E:
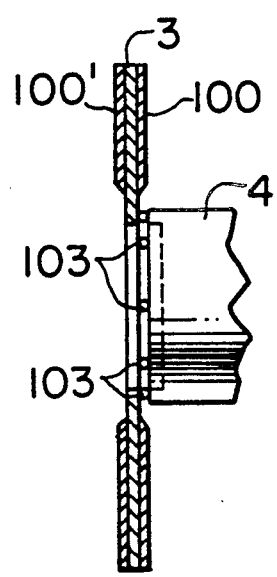

The surface wave vibrator 4 shown in FIG. 1 is in a circular ring form, whereas in the case of the surface wave vibrator 4 shown in FIG. 5B and FIG. 5C, projection 103 are provided at parts in contact with the disk substrate. FIG. 5B and FIG. 5C show a 3-point interference mode, and FIG. 5D and FIG. 5E show an 8-point interference mode. Other multiple-point inference modes are effectively available.

In FIG. 1 one embodiment of an apparatus suitable for dispersion and orientation of magnetic powders in a magnetic paint layer applied to a substrate by another coater is known, but in the same apparatus, coating of a magnetic paint, and dispersion, orientation and orientation of the magnetic powders under a magnetic field can be carried out. For example, magnets are made to be movable, and a magnetic paint is applied to a substrate in a magnets-removed state, and then the magnets are provided again at the predetermined location to conduct dispersion, orientation and orientation under a magnetic field. In FIG. 1, FIG. 5A, FIG. 5C and FIG. 5E, numerals 100 and 100' are magnetic recording films.

The present invention will be further explained in detail below, referring to Examples.

EXAMPLE 1

70 g of polyvinylbutyral powders and 700 g of needle-like $\gamma$-$Fe_2O_3$ magnetic powders (average particle size: 0.35×0.06 $\mu$m; coercivity Hc: 330 Oe; specific surface area BET: 22 $m^2/g$) were placed in a kneader and kneaded for about 15 minutes. Then, 250 g of 2-ethoxyethyl acetate was slowly added thereto, and the mixture was further kneaded for about 4 hours. Then, 480 g of the kneaded mixture was placed in a ball mill pot having a capacity of 3 l together with 3 g of alumina and 700 g of 2-ethoxyethyl acetate and the mixture was subjected to ball mill mixing for 7 days to thoroughly disperse the magnetic powders and alumina. Then, 120 g of phenol resin, 300 g of 40% epoxy resin solution in butoxyethanol and 500 g of butoxyethanol were added thereto and the mixture was further mixed to prepare a magnetic paint. Then, the thus obtained magnetic paint was then applied to the cleaned surfaces of an aluminum disk 3, 5.25 inches in diameter (40 mm in inner diameter and 130 mm in outer diameter) and 2 mm thick, by spin coating, and then immediately the aluminum disk was placed in an apparatus for producing a magnetic disk, shown in FIG. 1 and subjected to application of random type mode surface waves and longitudinal orientation under a magnetic field simultaneously for 30±5 seconds. Then, the coating films were cured at 210° C. to form magnetic recording films 100 and 100'. The surface wave vibrator 4 having a flat contact surface to the magnetic disk substrate 3 without any artificial projections was used. Surface waves of random type mode were generated by adjusting the degree of fastening between the surface wave vibrator 4 and the substrate 3. Then, the squareness ratio of magnetic recording films was measured.

Figure 2:
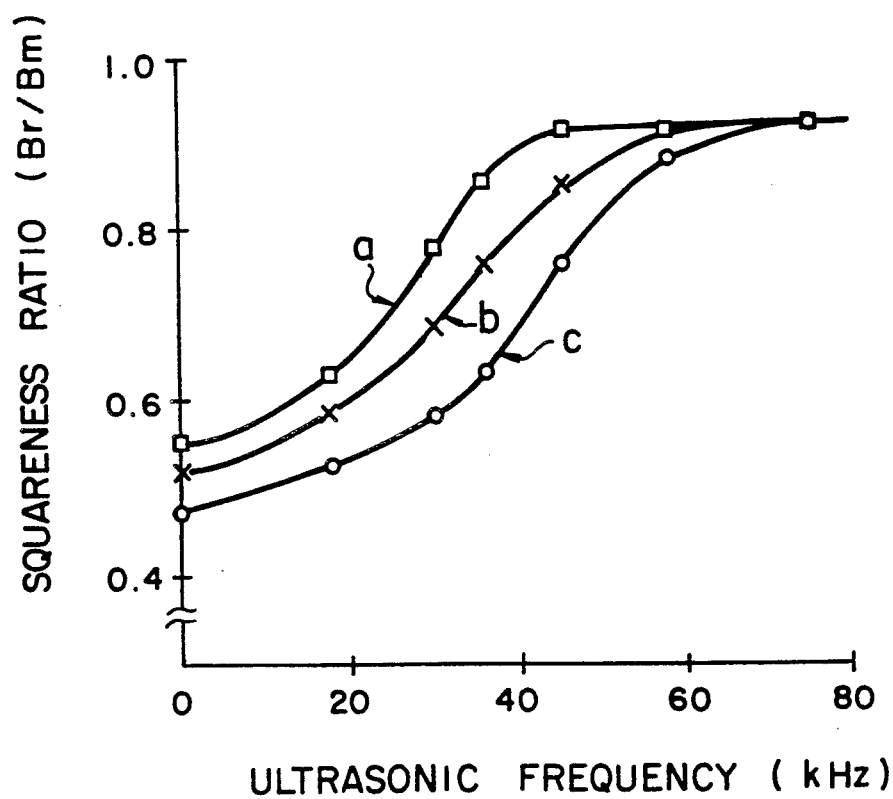
FIG. 2 is a diagram showing a relationship between the ultrasonic frequency applied to a surface wave vibrator and the squareness ratio.

Relationship between the ultrasonic frequency applied to the surface wave vibrator 4 and the squareness ratio (Br/Bm) of the thus obtained magnetic recording films is shown by curve a in FIG. 2. As is obvious from FIG. 2, the magnetic disk having a squareness ratio of more than 0.55, standard level for quality product, was obtained by application of surface waves. With increasing ultrasonic frequency, the squareness ratio was increased, and with further increase in the ultrasonic frequency, the squareness ratio was saturated. The ultrasonic frequency was preferably 30 kHz or more, more preferably 35 kHz or more.

After the measurement of the squareness ratio, the magnetic recording films were surface finished to a film thickness in the inner peripheral region of 0.32 μm.

The recording-reproduction characteristics of the magnetic disk were determined with a MnZn ferrite head with a gap length of 0.5 μm, and it was found that the S/N ratio was increased by 5-10%, as compared with that of the conventional magnetic disks prepared without any application of surface waves.

EXAMPLE 2

The same treatment as in Example 1 was carried out except that needle-like Co-γ-Fe$_2$O$_3$ magnetic powders (average particle size: 0.40×0.07 μm; coercivity Hc: 650 Oe; specific surface area BET: 22.5 m$^2$/g) were used in place of the needle-like γ-Fe$_2$O$_3$ magnetic powders. The squareness ratio was found smaller. Then, the same treatment was carried out by changing the mode of the surface waves from the random type mode to a concentric circle type mode. A surface wave vibrator 4 having 3 projections on the periphery at equal angular distances was used, as given by numerals 103 in FIGS. 5B and 5C. The result is given by curve b in FIG. 2. The S/N ratio was increased by 5-10%, as compared with that of the conventional magnetic disks.

EXAMPLE 3

The same treatment as in Example 1 was carried out except that needle-like Co-γ-Fe$_2$O$_3$ fine magnetic powders (average particle size: 0.2×0.02 μm; coercivity Hc: 770 Oe; specific surface area BET: 50 m$^2$/g) was used in place of the needle-like γ-Fe$_2$O$_3$ magnetic powders. The squareness ratio was found smaller. Even by application of surface waves of concentric circle type mode as used in Example 2, the same result as above was obtained. Thus, surface waves of interference type mode were applied with the same surface wave vibrator 4 of concentric circle type mode as used in Example 2, as shown in FIGS. 5B and 5C. The result is given by curve c in FIG. 2. The S/N ratio was increased by 5-10%, as compared with that of the conventional magnetic disks. As shown in Examples 1 to 3, the effect on dispersion and orientation became lower in the order of random type mode and concentric circle type mode with increasing coercivity Hc and specific surface area BET of the magnetic powders, and it was found necessary to use interference type mode having a highest effect on dispersion and orientation for higher coercivity powders.

EXAMPLE 4

25 parts by weight of powdery epoxy resin, 100 parts by weight of plate-like barium ferrite magnetic powders of hexagonal system (about 0.1 μm in diameter; coercivity Hc: 655 Oe; specific surface area BET: 30 m$^2$/g) and 5 parts by weight of single crystal alumina were thoroughly mixed and then 10 parts by weight of cyclohexanone was added thereto. Then, the mixture was kneaded in a kneader and after addition of 5 parts by weight of cyclohexanone thereto the mixture was further kneaded for about 4 hours.

Then, the kneaded product was placed in a ball mill pot having a capacity of 3 l and 140 parts by weight of a solvent mixture (1 : 1) of cyclohexanone and isophorone was added thereto. The mixture was subjected to ball mill mixing for 3 days to disperse the magnetic powders. Then, 25 parts by weight of phenol resin and 6 parts by weight of vinyl resin were dissolved in 490 parts by weight of a solvent mixture (1 : 1 : 1) of cyclohexanone, isophorone and dioxane, and the resulting solution was added to the mixture to prepare a magnetic paint. Then, the magnetic paint was applied to cleaned surfaces of an aluminum substrate 3, 5.25 inches in diameter and 2 mm thick, by spin coating. Then, the magnetic disk was placed in an apparatus for producing a magnetic disk and surface waves of interference type mode were applied thereto. In that case, a surface wave vibrator 4 having three projections as used in Examples 2 and 3 was used, as shown in FIGS. 5B and 5C. Coating films with orientation only by application of surface waves of interference type mode and coating films with longitudinal orientation by simultaneous application of a magnetic field were prepared. The coating films were then cured at 210° C. to form magnetic recording films 100 and 100', and their squareness ratio was measured. Then, the magnetic recording films were surface finished to a thickness of 0.3 μm (roughness Ra<0.02 μm), and a fluorocarbon-based liquid lubricant was applied thereto to prepare magnetic disks. Recording-production characteristics of the magnetic disks were determined with a metal-in-gap type head with a gap length of 0.3 μm, and it was found that the S/N ratio was increased by 2-6% in the case of orientation without application of magnetic field and by 7-12% in the case of orientation with simultaneous application of magnetic field, as compared with that of the conventional magnetic disks prepared without application of surface waves.

Relationship between the ultrasonic frequency applied to the surface wave vibrator 4 and the squareness ratio of the magnetic recording films prepared with orientation by simultaneous application of magnetic field was found to be substantially the same as that of Example 3, given by curve c in FIG. 2. That is, it was found that the magnetic powders were oriented in the better direction by application of surface waves of interference type mode even in the case of plate-like magnetic powders.

According to the present invention, a magnetic disk with distinguished electromagnetic properties such as high S/N ratio, etc. can be prepared while preventing reaggregation of the magnetic powders in a magnetic paint.

What is claimed is:

1. A process for producing a rigid magnetic disk, which comprises applying a magnetic paint containing at least magnetic powders in a dispersion state in a macromolecular binder to a non-magnetic disk substrate and then longitudinally orienting the magnetic powders by generating standing waves or interference waves in the applied magnetic paint while keeping the applied magnetic paint in an undried state, thereby forming a magnetic recording film on the non-magnetic substrate.

2. A process according to claim 1, wherein the magnetic powders are plate-like powder of barium ferrite of hexagonal system.

3. A process according to claim 1, further comprising rotating the non-magnetic substrate while generating the standing waves or interference waves in the applied magnetic paint.

4. A process according to claim 1, further comprising applying a magnetic field to said applied magnetic paint.

5. A process according to claim 4, wherein said magnetic field is applied to said applied magnetic paint generating of said standing waves or interference waves.

6. A process according to claim 4, wherein said magnetic field is applied to said applied magnetic paint after said generating of said standing waves or interference waves.

7. A process for producing a rigid magnetic disk, which comprises applying a magnetic paint containing at least magnetic powders in a dispersion state in a macromolecular binder to a non-magnetic disk substrate and then longitudinally orienting the magnetic powders by generating standing waves or interference waves in the applied magnetic paint by contacting a surface wave vibrator with the non-magnetic substrate while keeping the applied magnetic paint in an undried state, thereby forming a magnetic recording film on the non-magnetic substrate.

8. A process according to claim 7, wherein a magnetic field is applied longitudinally when the standing waves or interference waves are generated in the applied magnetic paint.

9. A process according to claim 8, wherein the magnetic powders are plate-like powder of barium ferrite of hexagonal system.

10. A process according to claim 7, wherein the surface wave vibrator has at least one projection that is in contact with the non-magnetic substrate.

11. A process according to claim 7, further comprising rotating the non-magnetic substrate while applying the surface waves to the applied magnetic paint.

12. A process according to claim 7, further comprising applying a magnetic field to said applied magnetic paint.

13. A process according to claim 12, wherein said magnetic field is applied to said applied magnetic paint concurrently with said generating of said standing waves or interference waves.

14. A process according to claim 12, wherein said magnetic field is applied to said applied magnetic paint after said generating of said standing waves or interference waves.

* * * * *

UNITED STATES PATENT AND TRADEMARK OFFICE
CERTIFICATE OF CORRECTION

PATENT NO. : 5,180,608
DATED : 19 January 1993
INVENTOR(S) : Katsuyoshi CHIBA et al It is certified that error appears in the above-indentified patent and that said Letters Patent is hereby corrected as shown below:

| Column | Line | |
|---|---|---|
| 2 | 48 | After "producing" insert --a magnetic disk, which--. |
| 6 | 6 | Change "rotatably" to --rotatable--. |
| 6 | 68 | Delete "Then,"; change "the" to --The--. |
| 9 | 28 | After "paint" insert --concurrently with said--. |
| 10 | 15 | Change "powder" to --powders--. |
| 10 | 22-23 | Delete "applying the surface waves to" and insert therefor --generating the standing waves or interference waves in--. |

Signed and Sealed this

Twenty-ninth Day of March, 1994

*Attest:*

BRUCE LEHMAN

*Attesting Officer*      Commissioner of Patents and Trademarks